United States Patent [19]
Lee

[11] Patent Number: 5,697,633
[45] Date of Patent: *Dec. 16, 1997

[54] SUSPENSION SYSTEM OF FRONT WHEELS FOR A VEHICLE

[75] Inventor: Unkoo Lee, Kyungki-do, Rep. of Korea

[73] Assignee: Hyundai Motor Company, Seoul, Rep. of Korea

[*] Notice: The term of this patent shall not extend beyond the expiration date of Pat. No. 5,372,377.

[21] Appl. No.: 448,564

[22] PCT Filed: Nov. 1, 1994

[86] PCT No.: PCT/KR94/00153

§ 371 Date: Jun. 7, 1995

§ 102(e) Date: Jun. 7, 1995

[87] PCT Pub. No.: WO95/12500

PCT Pub. Date: May 11, 1995

[30] Foreign Application Priority Data

Nov. 1, 1993 [KR] Rep. of Korea .................. 93-23007

[51] Int. Cl.⁶ .................................................. B60G 3/00
[52] U.S. Cl. ........................ 280/691; 280/675; 280/660
[58] Field of Search ............................ 280/691, 675, 280/660, 668, 96.1, 666, 690, 701, 966; 267/248, 228

[56] References Cited

U.S. PATENT DOCUMENTS

| | | | |
|---|---|---|---|
| 4,238,261 | 12/1980 | Ogiso | 280/667 |
| 4,538,831 | 9/1985 | Kami et al. | 280/666 |
| 4,705,292 | 11/1987 | Hespelt et al. | |
| 4,875,703 | 10/1989 | Murakami | 280/665 |
| 4,878,688 | 11/1989 | Kubo | 280/693 |
| 4,964,651 | 10/1990 | Kubo | |
| 5,346,241 | 9/1994 | Lee | 280/691 |
| 5,348,334 | 9/1994 | Giltinan | 280/691 |
| 5,362,091 | 11/1994 | Lee | 280/662 |
| 5,372,377 | 12/1994 | Lee | 280/691 |
| 5,405,162 | 4/1995 | Chun | 280/660 |

FOREIGN PATENT DOCUMENTS

| | | |
|---|---|---|
| 0351376 | 1/1990 | European Pat. Off. . |
| 0370217 | 5/1990 | European Pat. Off. . |
| 2305449 | 8/1974 | Germany . |

*Primary Examiner*—Eric D. Culbreth
*Assistant Examiner*—Jonathan E. Bulls
*Attorney, Agent, or Firm*—Birch, Stewart, Kolasch & Birch, LLP

[57] ABSTRACT

A multi-link suspension system for vehicular front wheels, having a strut assembly; a wheel carrier having upper and lower portions; a connecting arm assembly having upper and lower portions, the upper portion being higher than said wheel carrier and the lower portion having a wheel-side protrusion connected to the upper portion of said wheel carrier and vehicle body-side protrusions pivotally connected to a lower end of a strut, and the connecting arm assembly being curved; an upper control link for connecting the upper portion of the connecting arm assembly to the vehicle body; a pair of middle control links for connecting the lower portion of the connecting arm assembly to the vehicle body; a pair of lower control links for connecting the lower portion of the wheel carrier to the vehicle body; and a trailing arm for connecting the wheel-side protrusion of said connecting arm assembly to the vehicle body, disposed in the longitudinal direction of the vehicle.

8 Claims, 5 Drawing Sheets

(Conventional Art)

5,697,633

SUSPENSION SYSTEM OF FRONT WHEELS FOR A VEHICLE

BACKGROUND OF THE INVENTION (1) Field of the Invention

The present invention relates to a suspension system of front wheels for a vehicle, and more particularly to a multi-link suspension system of front wheels for a vehicle which can absorb an impact from the wheel to the vehicle body, reduce the impact by spreading the suspension loads to the body over a wider area, maximize the effective space for an engine room, and increase a free layout degree for the front wheel alignments.

(2) Description of the Conventional Art

The common designs for the front suspension of the vehicle are Wishbone and MacPherson types. FIG. 6A and 6B show a conventional MacPherson type suspension system which comprises a steering knuckle 100, a strut 104 having a shock absorber 102, a lower arm 106, and a ball joint 108. The MacPherson strut provides major advantages in package space for a transverse engine.

When the offset A (FIG. 6B) becomes small, the knuckle loads and kingpin loads are reduced and the tendency of toe-out is reduced during driving. In order to make the offset A smaller or negative (−), a supporting point 110 of the strut 104 should be moved to the engine room side or the ball joint 108 should be moved to the outside of the wheel. However, in case of the former, the effective volume of the engine room is reduced and the kingpin angle B becomes too large, which adversely affects cornering performance. In case of the latter, it is difficult to move the ball joint 108 toward the wheel, because of the interference with the brake disc.

FIG. 7A and 7B show a conventional Wishbone type suspension system which comprises lower and upper arms 122 and 120, a steering knuckle 124, a spring assembly 128 having a shock absorber 126, and ball joints 132 and 130 for connecting the lower and upper arms 122 and 120 to the steering knuckle 124, respectively. In the Wishbone type suspension system, the problem of making the offset A smaller or negative (−) is similar to the MacPherson type suspension system.

As described above, in the conventional MacPherson and Wishbone type suspension systems, a free layout degree for establishing the kingpin angle B is limited within a small range and there is a limit to improve the functions of suspension systems. Also, since the bounce and rebound of the wheel is dependent on a short control link such that the change of the roll-center height is large, the driving stability is relatively lacking. Further, since the number of the links of the suspension systems is small, the impact applied to the vehicle body can not be spread over a wide area and the ability of the suspension system to absorb impact is not good, which causes the ride comfort and impact safety to be bad.

SUMMARY OF THE INVENTION

Therefore, the present invention has been made in an effort to solve the above-described problems.

It is an object of the present invention to provide a multi-link type suspension system which has a high free layout degree for wheel alignments and makes the change of the roll-center height small, thereby improving a steering stability.

It is another object of the present invention to provide a multi-link type suspension system which can maximize the effective volume of the engine room.

It is still another object of the present invention to provide a multi-link type suspension system which can spread the suspension loads over a wider area to reduce any impact transmitted to the vehicle body, thereby improving ride comfort.

In order to achieve the above objects, the invention provides a multi-link suspension system which comprises a wheel carrier, a curved connecting arm assembly having upper and lower portions, wherein the upper portion of the connecting arm assembly is higher than the wheel carrier, an upper control link, a pair of middle control links, and a pair of lower control links.

Other and further objects of this invention will become obvious upon an understanding of the illustrative embodiments about to be described or will be indicated in the appended claims, and various advantages not referred to herein will occur to one skilled in the art upon employment of the invention in practice.

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENT

Figure 2:
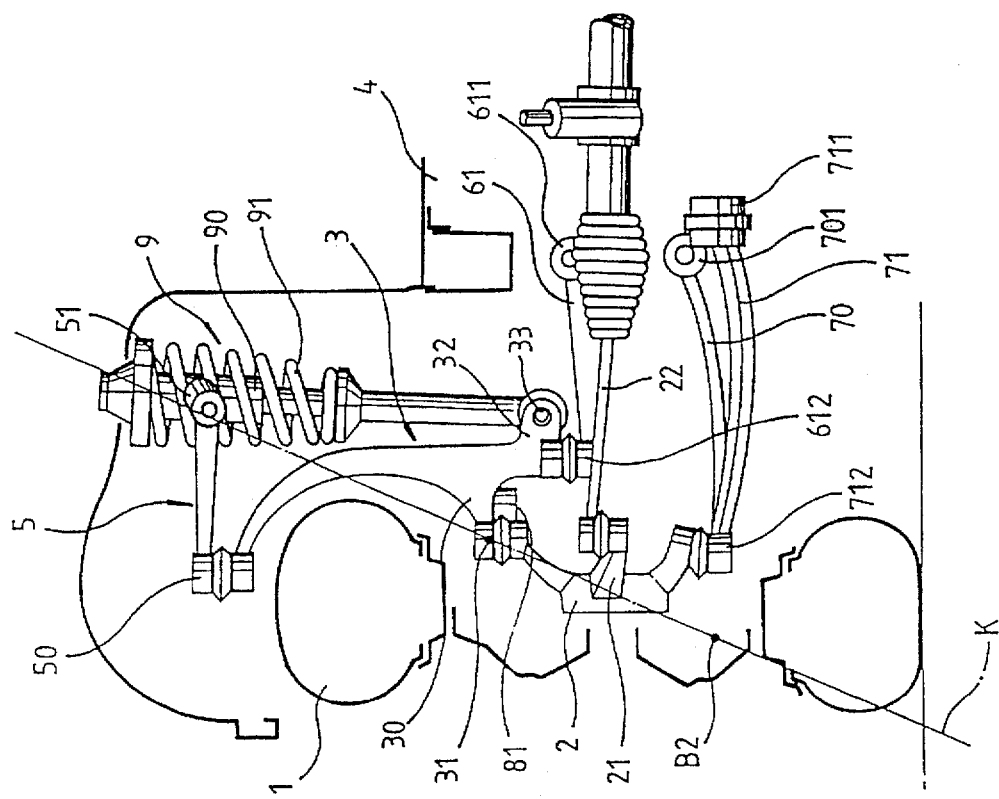
FIG. 2 is a rear elevation thereof.
Figure 1:
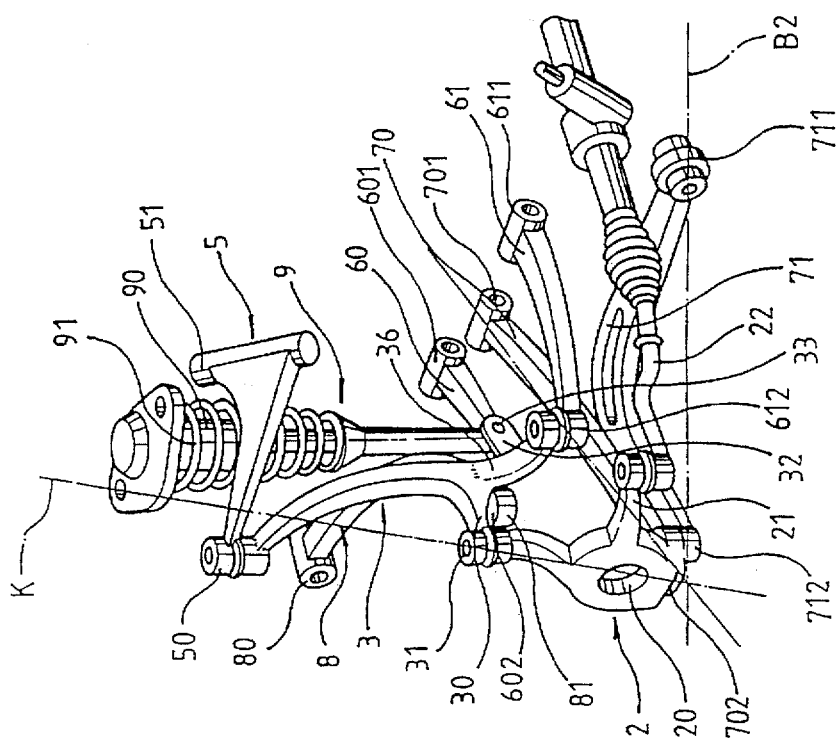
FIG. 1 is a perspective view of the suspension system of the present invention.
Figure 4:
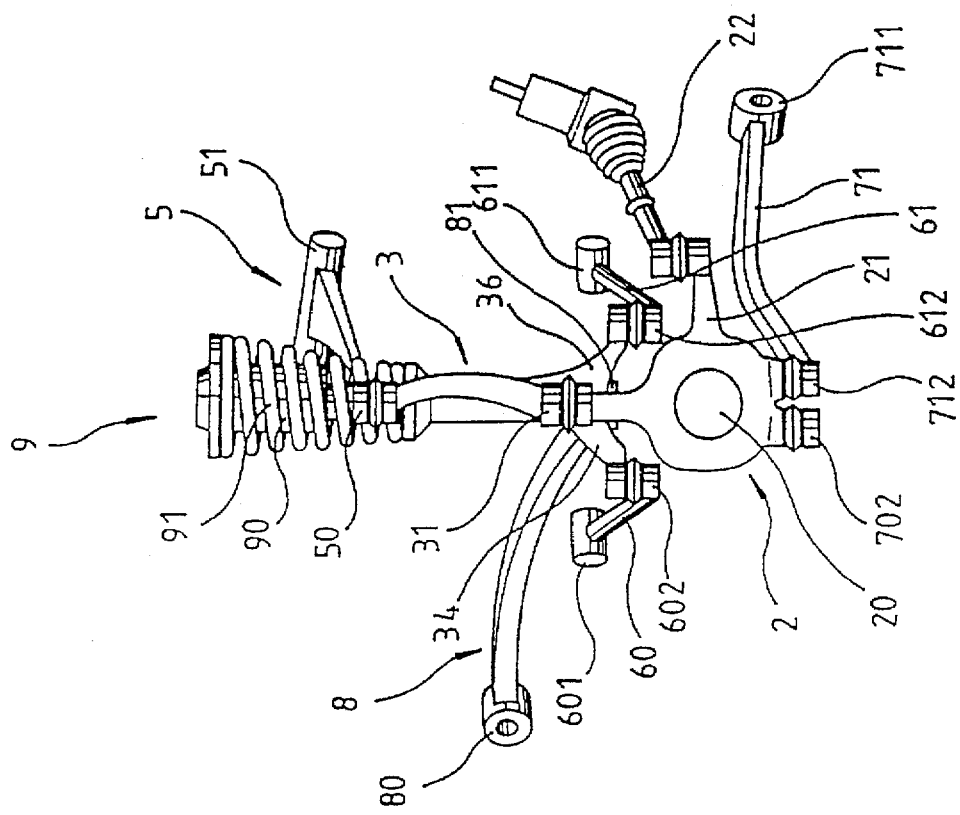
FIG. 4 is a side view thereof.
Figure 3:
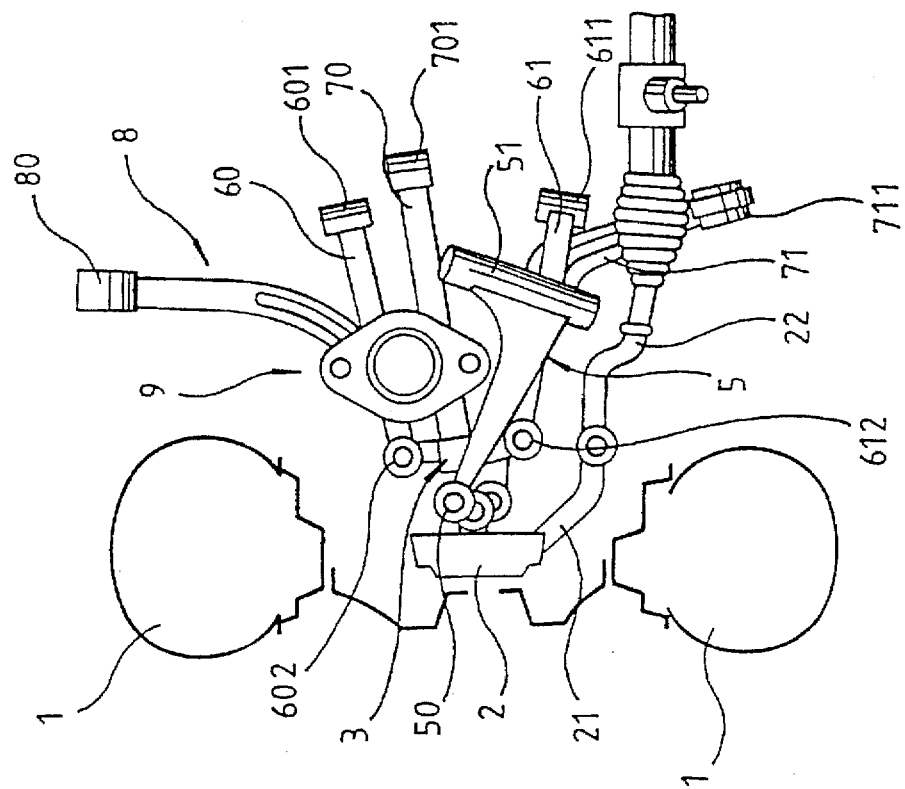
FIG. 3 is a plan view thereof.

FIGS. 1 through 4 show an embodiment of the suspension system according to the present invention. The suspension comprises a wheel carrier 2; a connecting arm assembly 3 connected to an upper portion of the wheel carrier 2, having an upper portion connected to the vehicle body via an upper control link 5, wheel side and body side protrusions 30 and 32, and front and rear protrusions 34 and 36; a pair of middle control links 60 and 61 for connecting the front and rear protrusion 34 and 36 to a car body 4, respectively; a pair of lower control links 70 and 71 for connecting a lower portion of the wheel carrier 2 to the body 4; a trailing arm 8 for connecting the connecting arm assembly 3 to a side member of the body 4, disposed in the longitudinal direction of the vehicle; and a strut assembly 9.

The wheel carrier 2 rotatably supports wheel 1 and, if it is a steering wheel, has a hole for a drive shaft to penetrate. A tie rod 22 is connected to a rear protrusion of the wheel carrier 2 by a ball joint and the wheel carrier 2 is steered via the tie rod 22.

The connecting arm assembly 3 curves around the upper half of the wheel 1 and has an upper portion which is higher than the wheel 1 and lies inside the vertical center line of the wheel 1. The lower portion of the connecting arm assembly 3 has a wheel side protrusion 30 and a body side protrusion 32. The former 30 is higher than the latter 32. An end portion 31 of the wheel side protrusion 30 is connected to the upper end of the wheel carrier 2 by a ball joint and the lower portion of the strut assembly 9 is pivotally connected to an end portion 33 of the body side protrusion 32.

An end 50 of the upper control link 5 is connected to the upper portion of the connecting arm assembly 3 by a ball joint and the other end 51 of the upper control link 5 is pivotally connected to the vehicle body 4 by a rubber bushing. The end 50 of the upper control link 5 lies in the back of the strut assembly 9.

The pair of the middle control links 60 and 61 have connecting portions 601 and 602; 611 and 612 at their ends, respectively. The body side connecting portions 601 and 611 are pivotally connected to the body 4 by a rubber bushing and the wheel side connecting portions 602 and 612 are connected to the front and rear protrusions 34 and 36, respectively, by a ball joint or a rubber bushing.

The pair of the lower control links 70 and 71 have connecting portions 701 and 702; 711 and 712 at their ends, respectively. The body side connecting portions 701 and 711 are pivotally connected to the body or subframe 4 by a rubber bushing and the wheel side connecting portions 702 and 712 which horizontally lie adjacent to each other are connected to the lower portion of the wheel carrier 2 by a ball joint.

One 71 of the lower control links curves backward, while the other lower control link 70 is angled forward. Thus the body side connecting portions 701 and 711 are considerably distant from each other.

The trailing arm 8 disposed in the longitudinal direction of the vehicle curves inwards and has front and rear ends 80 and 81. The front end 80 is fixedly connected to the side member (not shown) of the body 4 by a rubber bushing. And the rear end 81 is connected is connected to a lower portion of the wheel side protrusion 30 of the connecting arm assembly 3 by a ball joint. The trailing arm 8 increases the stiffness of the suspension system under the longitudinal force of the vehicle and the impact of the wheel 1 is transmitted to the suspension system.

The ball joints used in the connecting portions described above are conventional and permit the wheel 1 with the wheel carrier 2 to move in bounce and rebound with respect to the body or subframe 4. And the rubber bushings used in the connecting portions described above are also conventional and have a proper elasticity for controlling up-down movement of the control links 5, 60, 61, 70, 71, and 8. The strut assembly 9 comprising a shock absorber 90 and a spring 91 is also conventional and is pivotally connected to the body side protrusion 32 of the connecting arm assembly 3 at the connecting portion 33.

Figure 5:
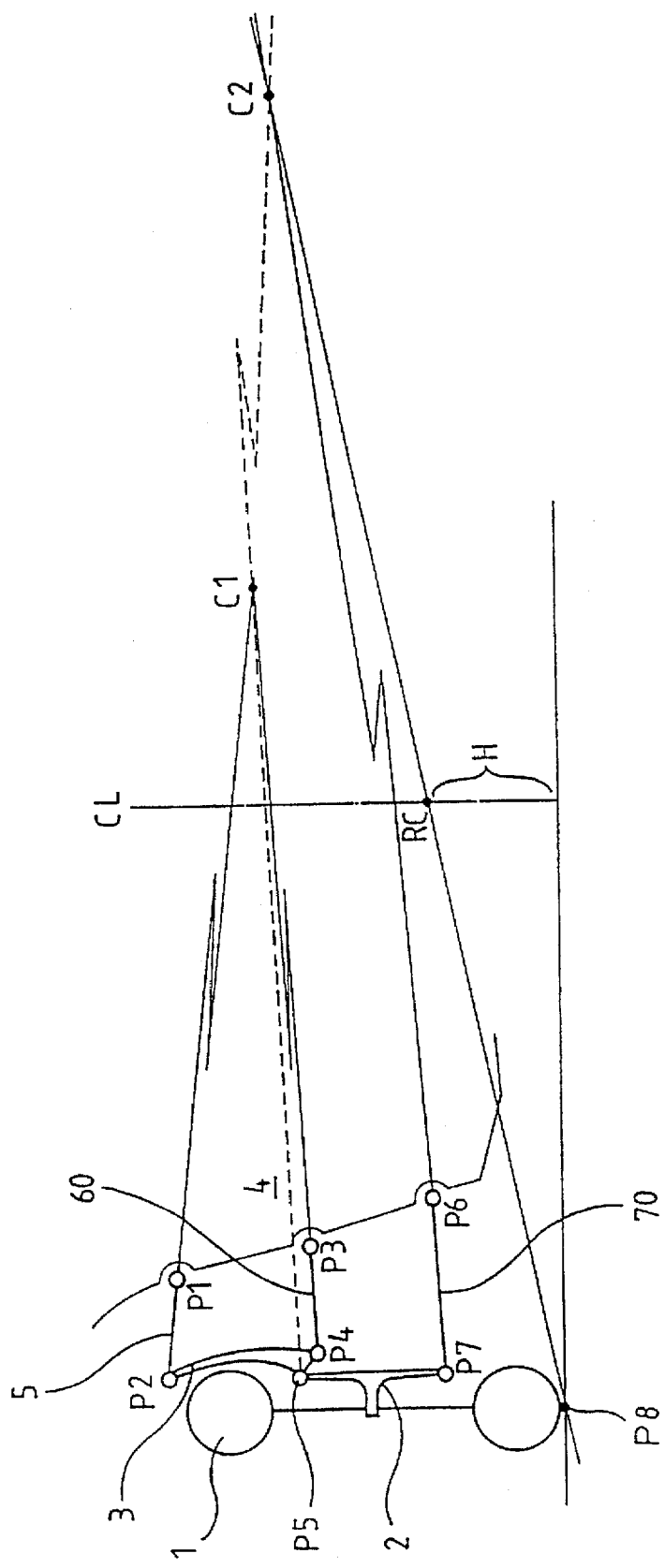
FIG. 5 is a schematic diagram illustrating an effect of the suspension system according to the present invention.
Figure 6B:
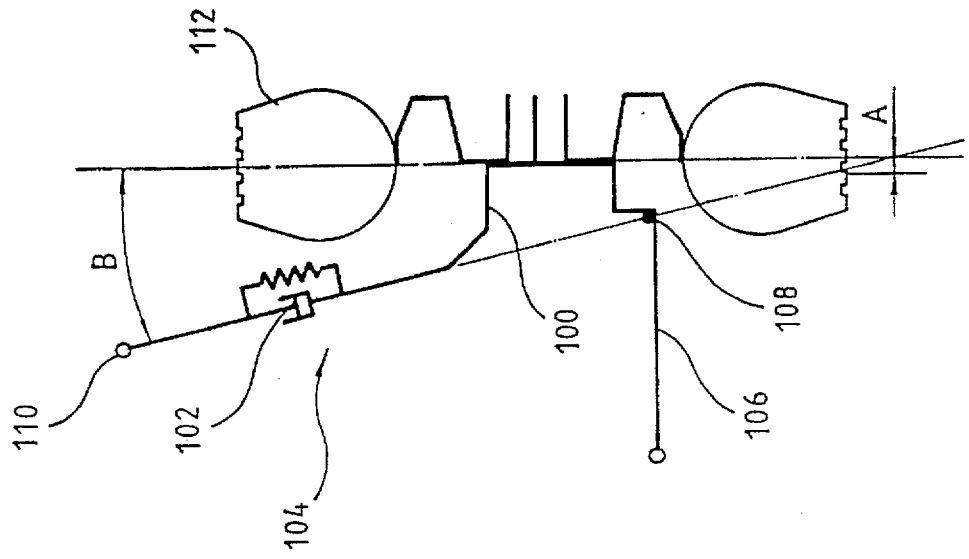
FIGS. 6A, 6B, 7A, and 7B are views of conventional suspension systems.
Figure 6A:
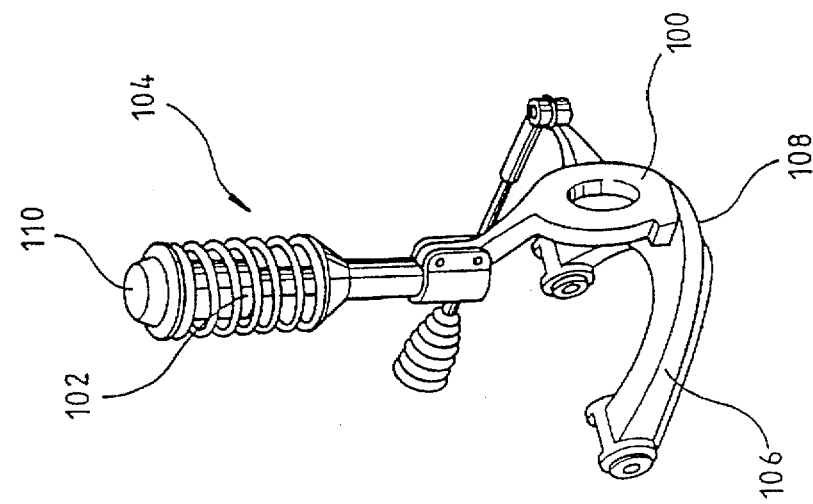
Figure 7B:
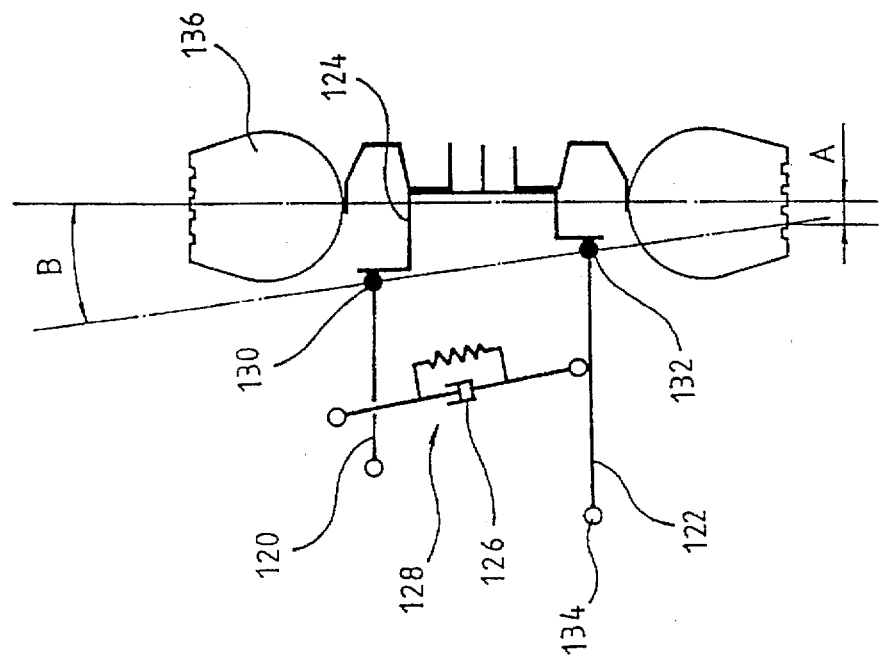
Figure 7A:
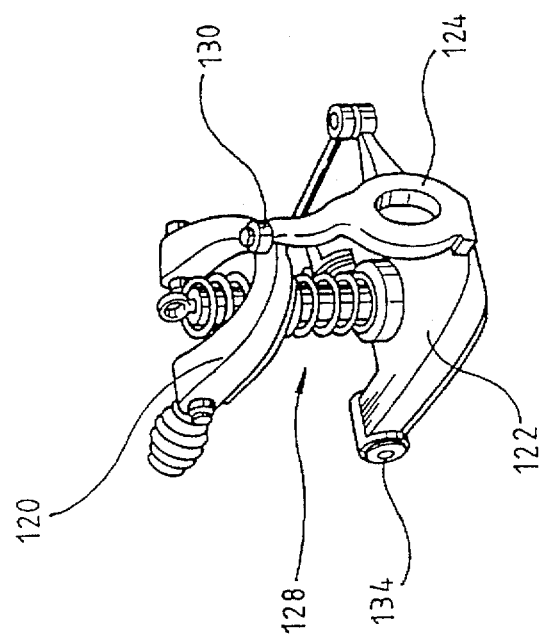

FIG. 5 explains a function of the suspension system and reference numerals for the connecting portions are newly designated as P1, P2, P3, P4, P5, P6, P7, and P8 for convenience. First, instantaneous centers with respect to the parts of the suspension system will be described.

Instantaneous centers of the upper, middle and lower control links 5; 60 and 61; and 70 and 71 with respect to the vehicle body 4 are the connecting points P1,P3, and P6 of the control links and the body 4, respectively. Instantaneous centers of the connecting arm assembly 3 with respect to the upper and middle control links 5; 60 and 61 are the connecting points P2, P4 of the upper and middle control links 5; 60 and 61 and the connecting arm assembly 3, respectively. Instantaneous centers of the wheel 1 with respect to the connecting arm assembly 3 and the lower control links 70 and 71 are the connecting points P5 and P7, respectively.

An instantaneous center of the connecting arm assembly 3 with respect to the vehicle body 4 is an intersecting point C1 where extended lines P2-P1 and P3-P4 meet. Instantaneous center of the wheel 1 with respect to the vehicle body 4 is an intersecting point C2 where extended lines P5-C1 and P6-P7 meet.

Therefore, the line P5-C1 is an imaginary swing arm, namely an imaginary upper control link. Since the imaginary swing control link P5-C1 is considerably long, the rotating angle of the imaginary swing arm P5-C1 is very small when the wheel 1 moves in bounce and rebound, which means that the height change of the instantaneous center C2 is relatively small. That is, the height H of roll center RC which is defined as an intersecting point of the line connecting the instantaneous center C2 and the grounding point P8 of the wheel 1 and a center line CL of the vehicle body 4 changes slightly, which means that driving stability is improved.

In the suspension of this structure, kingpin axis K is defined as a line connecting the connecting point 31 or P5 of the connecting arm assembly 3 and the wheel carrier 2 to an intersecting point B2 of the extended lines of the lower control links 70 and 71. That is, the kingpin K is formed in the function of the curvature of the curved connecting arm assembly 3, the position of the connecting point 31, the length of the lower control links 70 and 71, and the position of the connecting point 702 and 712. Thus, it is easy to establish a kingpin axis K by controlling the above mentioned elements independently of the changes of camber and tread, which means that the handling stability including straight ahead safety and handling safety can be improved by minimizing a sensitivity with respect to the steering.

Further, in order to establish a proper kingpin axis K, there is no need to move the shock absorber toward the vehicle body as are the cases of the above mentioned conventional suspension systems, therefore the effective volume of the engine room increases.

In conclusion, this invention provides a new multi-control link suspension system which has a number of merits. First, the front wheel alignments including kingpin axis, caster, and camber can be established independently of each other, which means that the free layout degree is increased. Second, the suspension system allows better control of roll center location. That is, the change of the roll center height becomes relatively small, which means that the handling stability is improved. Third, the multi-link type suspension system brings an effect of the spread of the suspension loads from the wheel. Fourth, by adapting a trailing arm the suspension system can absorb impact in the longitudinal direction of the vehicle.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A multi-link suspension system for front vehicular wheels comprising:

a vehicle;

a vehicle body;

a wheel;

a strut assembly;

a wheel carrier having upper and lower portions;

a connecting arm assembly having upper and lower portions, the upper portion being higher than said wheel carrier and the lower portion having a wheel-side protrusion connected to the upper portion of said wheel carrier and a vehicle body-side protrusion pivotally connected to a lower end of a strut, and said connecting arm assembly being curved;

an upper control link for connecting the upper portion of said connecting arm assembly to the vehicle body;

a pair of middle control links for connecting the lower portion of said connecting arm assembly to the vehicle body;

a pair of lower control links for connecting the lower portion of said wheel carrier to the vehicle body; and a trailing arm for connecting the wheel-side protrusion of said connecting arm assembly to the vehicle body, disposed in the longitudinal direction of the vehicle.

2. The multi-link suspension system for vehicular front wheels according to claim 1, wherein the wheel-side protrusion of said connecting arm assembly is higher than the vehicle body-side protrusion of said connecting arm assembly.

3. The multi-link suspension system for vehicular front wheels according to claim 1, wherein said upper control link is connected to the upper portion of said connecting arm assembly by a ball joint and connected to the vehicle body by an elastic bushing.

4. The multi-link suspension system for vehicular front wheels according to claim 1, wherein the upper control link is disposed behind said strut assembly.

5. The multi-link suspension system for vehicular front wheels according to claim 1, wherein the lower portion of said connecting arm assembly diverges into front and rear ends and said pair of middle control links are connected to the front and rear ends of the lower portion of said connecting arm assembly, respectively.

6. The multi-link suspension system for vehicular front wheels according to claim 5, wherein the front and rear ends of the lower portion of said connecting arm assembly are at a same elevation.

7. The multi-link suspension system for vehicular front wheels according to claim 1, having connecting points for connecting said lower control links to the lower portion of said wheel carrier at a same elevation and adjacent to each other, and wherein one of said lower control links angles forward and the other of said lower control links curves backward.

8. The multi-link suspension system for vehicular front wheels according to claim 1, wherein said trailing arm is connected to a bottom of the wheel-side protrusion of said connecting arm assembly.

* * * * *